(12) United States Patent
Kuntze et al.

(10) Patent No.: US 8,403,399 B2
(45) Date of Patent: Mar. 26, 2013

(54) COMPOSITE LIFTGATE SYSTEM

(75) Inventors: Christopher J. Kuntze, Clarkston, MI (US); Stephen R. Roddy, Harrison Township, MI (US); Martin McLeod, Barrie (CA); Michelle Vanbuskirk, Rochester Hills, MI (US); Alexander Kiselev, Rochester Hills, MI (US); Gari M. Schalte, Oakland Township, MI (US); Norman Guschewski, Rochester, MI (US)

(73) Assignee: Magna International Inc. (CA)

( * ) Notice: Subject to any disclaimer, the term of this patent is extended or adjusted under 35 U.S.C. 154(b) by 96 days.

(21) Appl. No.: 12/992,163

(22) PCT Filed: Jun. 1, 2009

(86) PCT No.: PCT/CA2009/000747
§ 371 (c)(1),
(2), (4) Date: Nov. 11, 2010

(87) PCT Pub. No.: WO2009/143627
PCT Pub. Date: Dec. 3, 2009

(65) Prior Publication Data
US 2011/0074179 A1 Mar. 31, 2011

Related U.S. Application Data

(60) Provisional application No. 61/130,489, filed on May 30, 2008.

(51) Int. Cl.
*B60J 5/10* (2006.01)
*B60J 9/00* (2006.01)

(52) U.S. Cl. .................. 296/146.8; 296/146.6; 296/205

(58) Field of Classification Search .............. 296/146.8, 296/56, 50, 146.5, 205, 29, 30, 193.08, 203.04, 296/193.06, 203.03, 210; 49/501; *B60J 9/00, B60J 5/10*
See application file for complete search history.

(56) References Cited

U.S. PATENT DOCUMENTS

| | | | | |
|---|---|---|---|---|
| 3,851,867 | A * | 12/1974 | Fricko | 267/120 |
| 4,822,098 | A * | 4/1989 | Vogt et al. | 296/146.5 |
| 5,181,759 | A * | 1/1993 | Doolittle | 296/153 |
| 5,449,213 | A * | 9/1995 | Kiley et al. | 296/56 |
| 5,944,373 | A | 8/1999 | Seksaria et al. | |
| 6,019,418 | A * | 2/2000 | Emerling et al. | 296/146.8 |
| 6,776,449 | B2 * | 8/2004 | Komatsu et al. | 296/146.5 |
| 6,929,308 | B2 | 8/2005 | Komatsu et al. | |
| 6,988,757 | B2 * | 1/2006 | McLaren et al. | 296/57.1 |
| 7,011,357 | B2 * | 3/2006 | Seksaria et al. | 296/146.2 |
| 7,306,279 | B2 | 12/2007 | Saitoh | |
| 7,503,619 | B2 * | 3/2009 | Werner | 296/146.8 |

(Continued)

FOREIGN PATENT DOCUMENTS

| | | |
|---|---|---|
| EP | 1120303 A1 | 8/2001 |
| EP | 1803597 A1 | 7/2007 |

(Continued)

*Primary Examiner* — Glenn Dayoan
*Assistant Examiner* — Sunsurraye Westbrook
(74) *Attorney, Agent, or Firm* — Warn Partners, P.C.; Marc Luddy

(57) ABSTRACT

The present invention is a thermoplastic composite liftgate system with reinforcements in key areas to allow the system to meet performance requirements, while lowering the tooling investment, lowering the system mass, and improving the styling flexibility. The present invention includes an inner panel and at least one bracket or reinforcement member connected to the inner panel such that when a force is applied to the bracket, the force is distributed to the inner panel.

32 Claims, 8 Drawing Sheets

U.S. PATENT DOCUMENTS

| | | | |
|---|---|---|---|
| 7,938,474 B2 * | 5/2011 | Bang | 296/180.1 |
| 2006/0022486 A1 | 2/2006 | Kalmbach et al. | |
| 2007/0170751 A1 * | 7/2007 | Tanaka et al. | 296/146.6 |
| 2007/0210613 A1 * | 9/2007 | Tanaka et al. | 296/146.6 |
| 2008/0030047 A1 * | 2/2008 | Munenaga et al. | 296/146.6 |

FOREIGN PATENT DOCUMENTS

| | | |
|---|---|---|
| GB | 2078628 A | 1/1982 |
| WO | 9842527 A1 | 10/1998 |

* cited by examiner

COMPOSITE LIFTGATE SYSTEM

CROSS-REFERENCE TO RELATED APPLICATIONS

This application claims the benefit of U.S. Provisional Application No. 61/130,489, filed May 30, 2008. The disclosure of the above application is incorporated herein by reference.

FIELD OF THE INVENTION

The present invention relates to liftgates for automobiles. More specifically, the present invention relates to a composite liftgate for an automobile.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis. Liftgates are traditionally made from stamped steel panels that are heavy and have a high tooling cost. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal components. Thermoplastic composite type materials used for liftgate applications also have difficulty meeting customer performance specifications.

Another concern with the manufacture of liftgates is that typical lifgates are manufactured as a relatively flat or smoothly contoured panel, with structural reinforcements such as ribs being added onto the panel. This will also add weight and increase manufacturing complexity as well.

One solution to this problem has been the 2008 Nissan Murano composite liftgate system, which has helped to satisfy the weight savings and the tooling cost concerns, but utilizes a typical bolt in small steel reinforcement at the latch which secures one end of the liftgate to the vehicle. This does not meet the higher load requirements desired in some applications, such as the latch pull test.

Accordingly, there exists a need for a composite liftgate which is both lightweight, as well as structurally sound enough to meet various load requirements.

SUMMARY OF THE INVENTION

The present invention is a thermoplastic composite liftgate system with reinforcements in key areas to allow the system to meet performance requirements, while lowering the tooling investment, lowering the system mass, and improving the styling flexibility. The present invention includes an inner panel, and at least one bracket, or reinforcement, connected to the inner panel such that when a force is applied to the bracket, the force is distributed to the inner panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
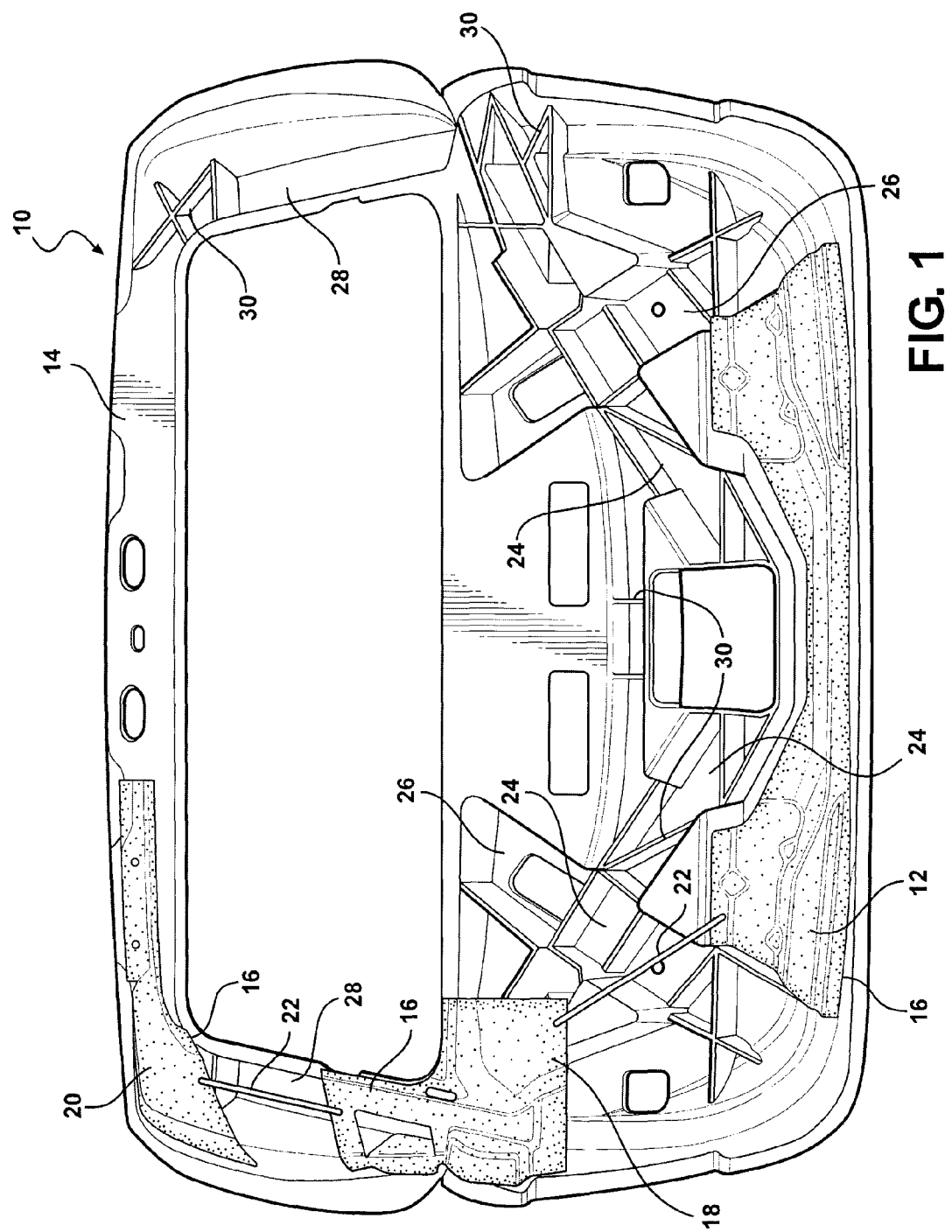
FIG. 1 is a rear view of an inner panel having multiple reinforcements used in a liftgate system, according to the present invention.
Figure 3:
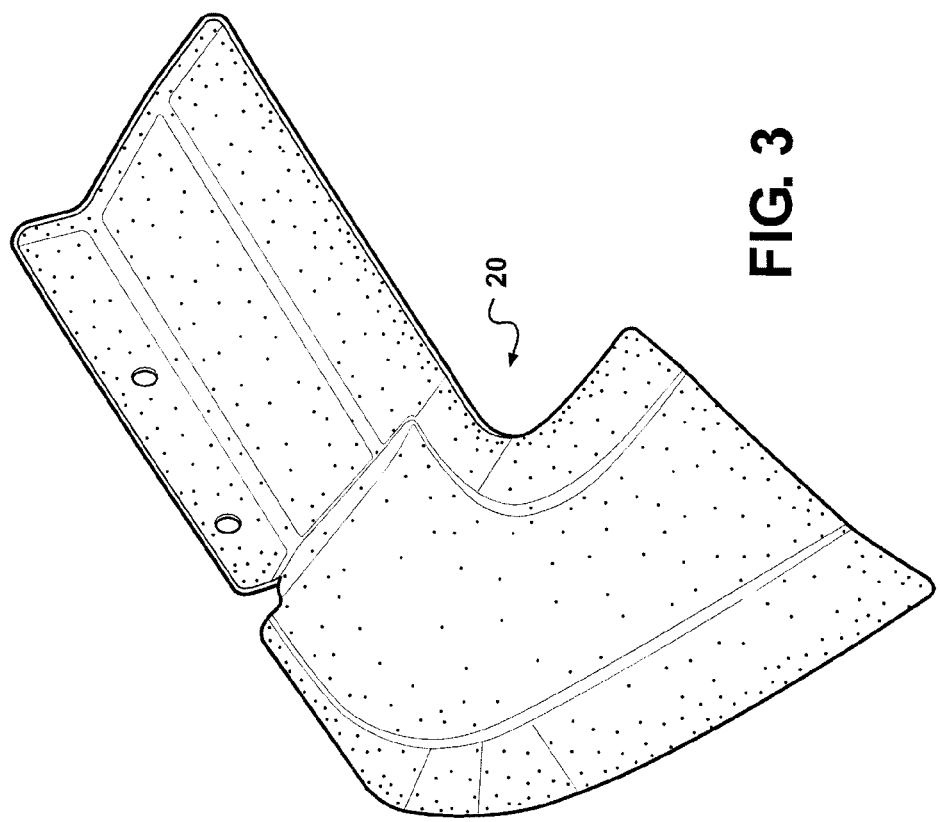
FIG. 3 is an enlarged perspective view of an upper pillar reinforcement used for a composite liftgate system, according to the present invention.
Figure 2:
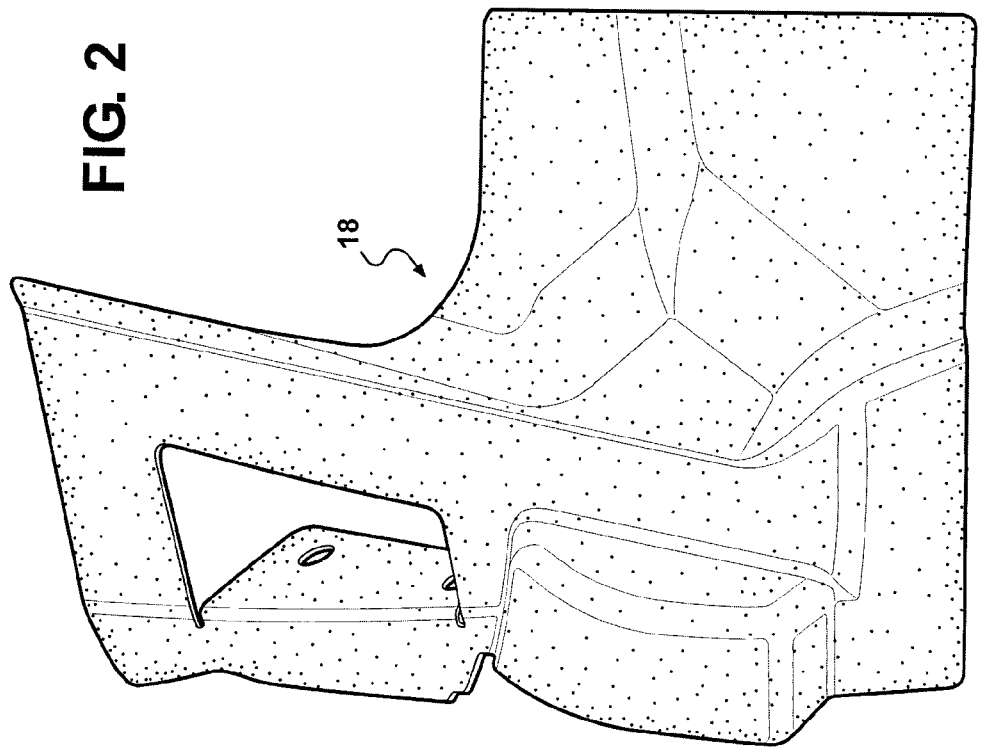
FIG. 2 is an enlarged perspective view of a lower pillar reinforcement used for a composite liftgate system, according to the present invention.
Figure 4:
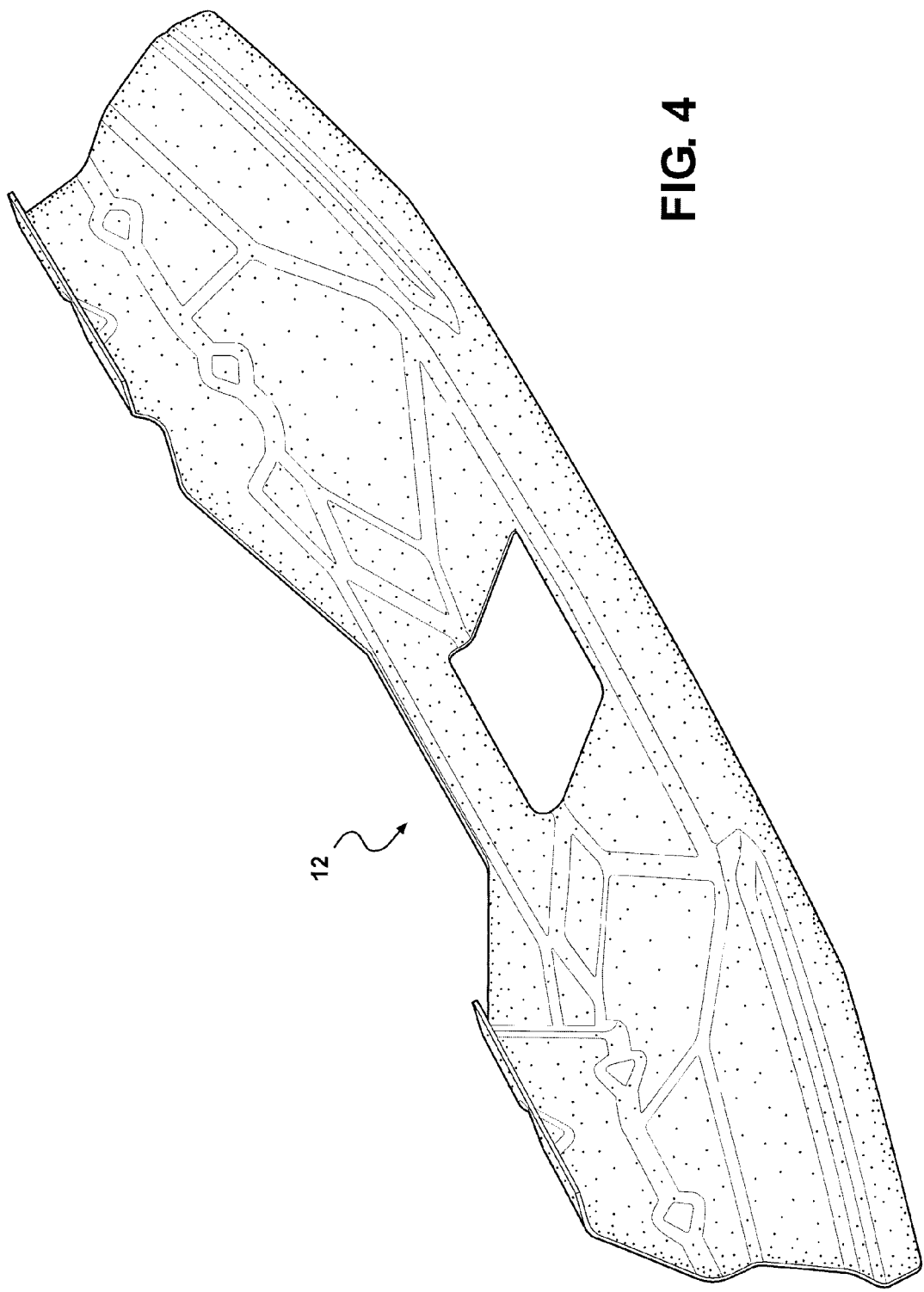
FIG. 4 is an enlarged perspective view of a wide reinforcing bracket used for a composite liftgate system, according to the present invention.
Figure 5:
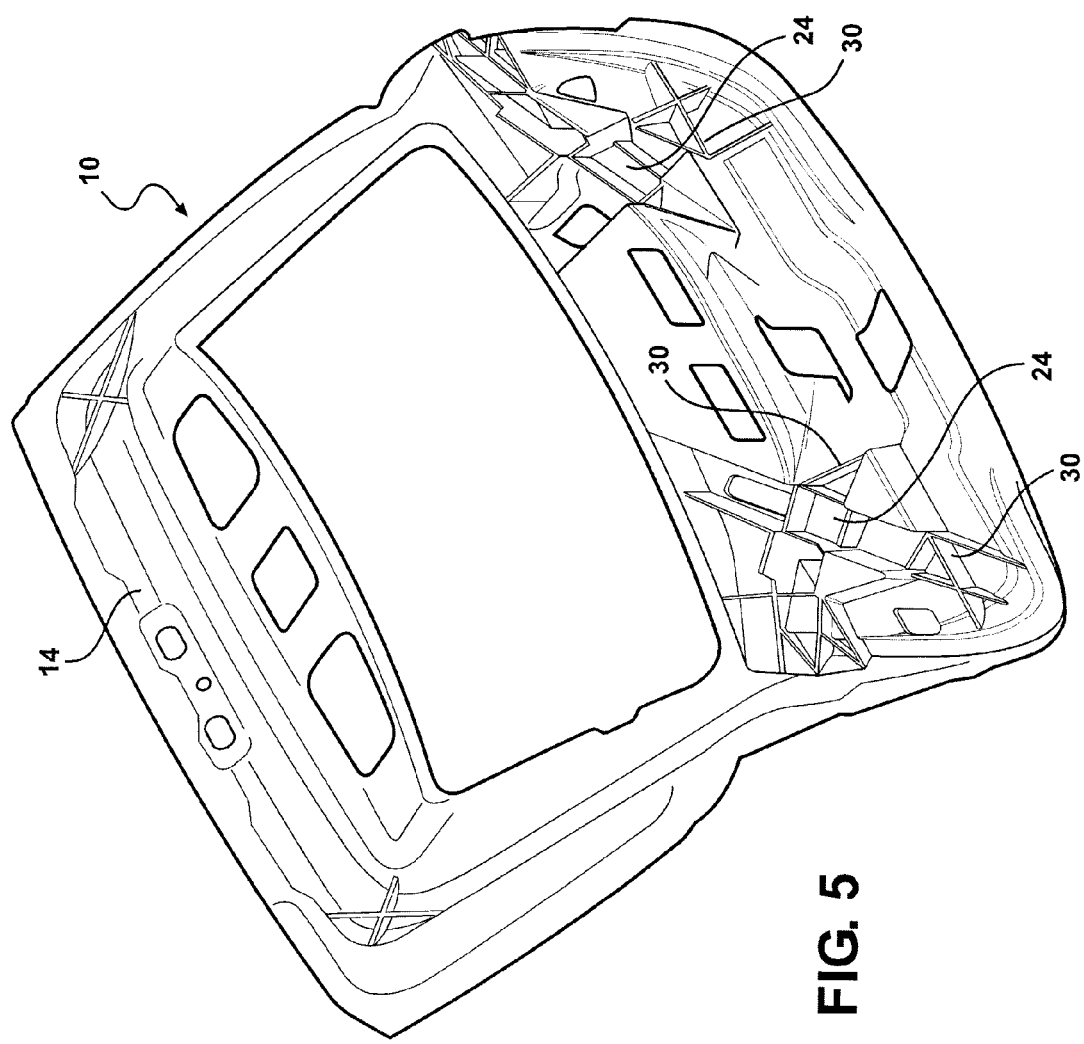
FIG. 5 is a perspective view of an inner panel used for a composite liftgate system, according to the present invention.
Figure 6:
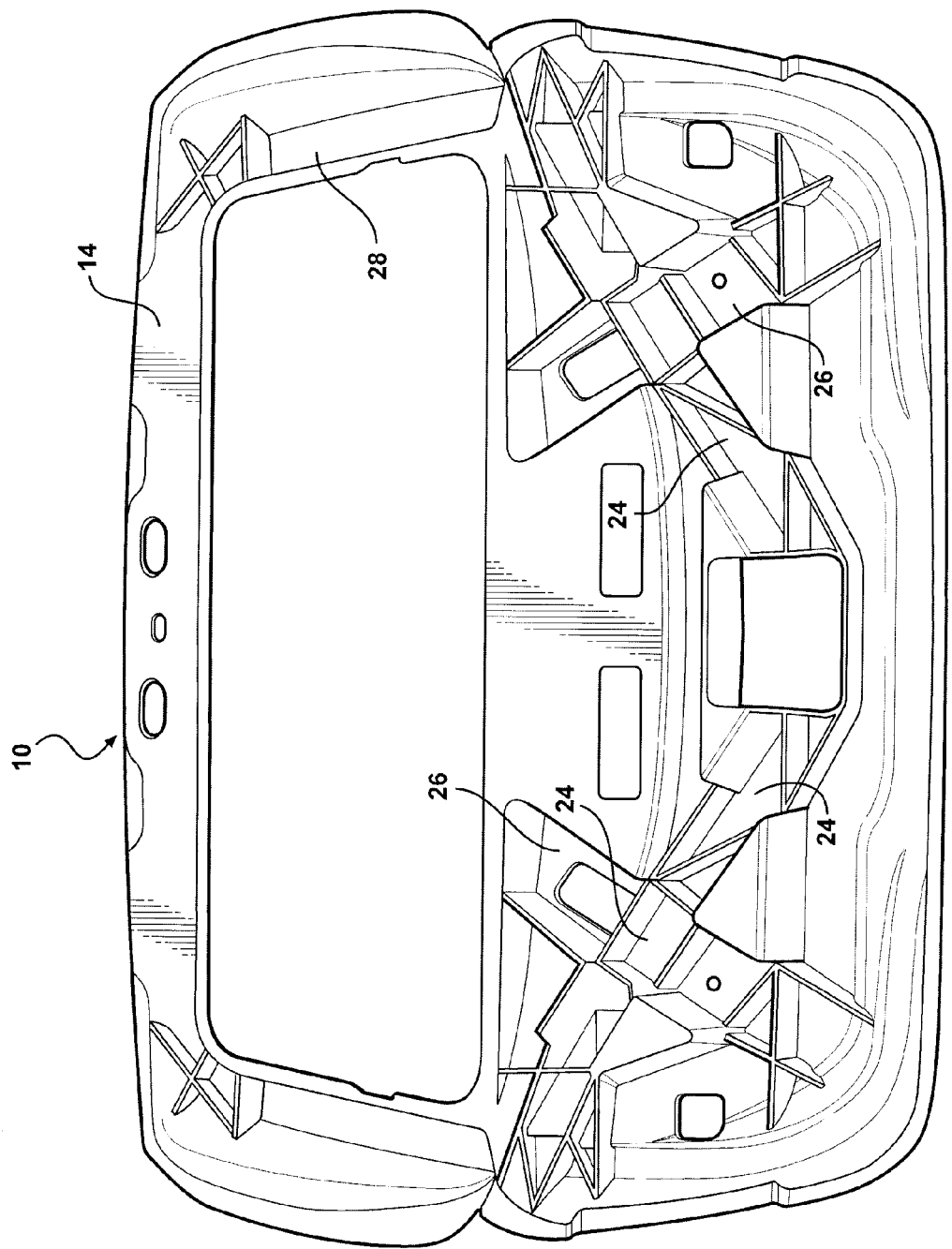
FIG. 6 is a rear view of an inner panel used for a composite liftgate system, according to the present invention.
Figure 7:
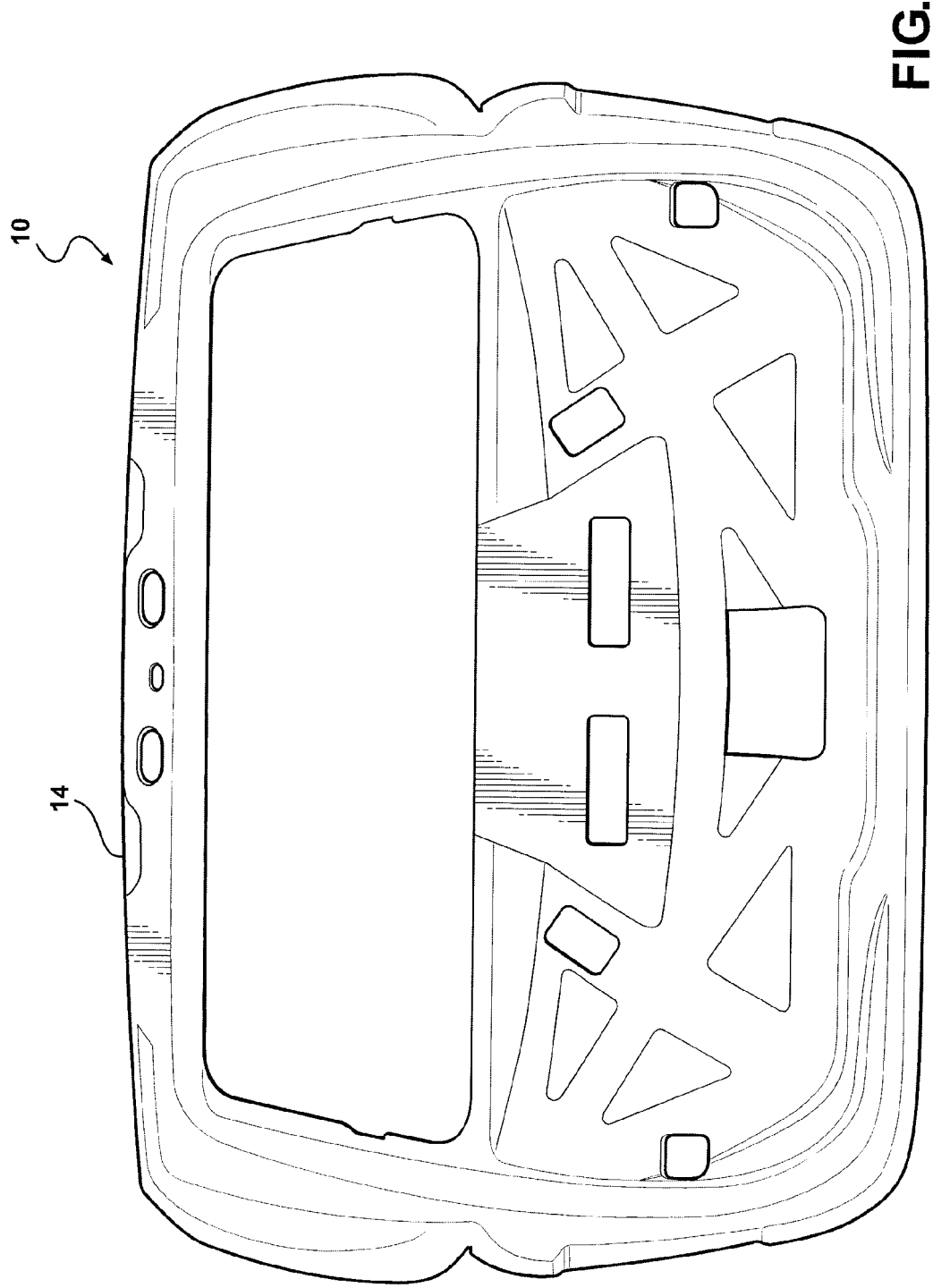
FIG. 7 is a front view of an inner panel used for a composite liftgate system, according to the present invention.
Figure 8:
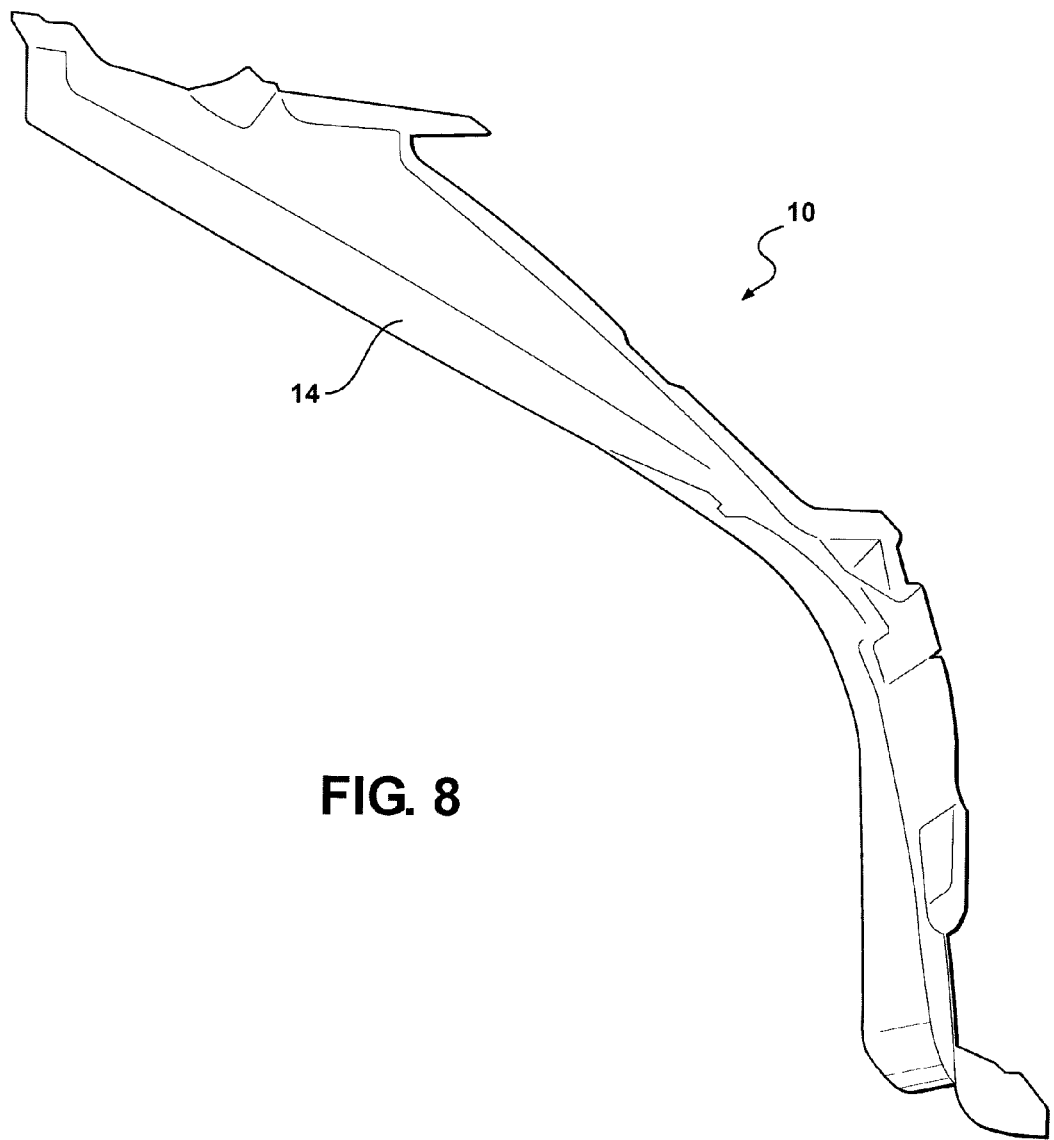
FIG. 8 is a side view of an inner panel used for a composite liftgate system, according to the present invention.

The following description of the preferred embodiment(s) is merely exemplary in nature and is in no way intended to limit the invention, its application, or uses.

The composite liftgate system of the present invention utilizes a wide reinforcing bracket along with a latch which aids in spreading the load applied to the bracket over a larger area. The wide reinforcement bracket adds more structure by attaching to the inner panel with structural adhesive or insert molding. Additionally, the wide reinforcing bracket is also tied into other reinforcing brackets with steel tethers. The other reinforcing brackets are also connected to a hinge system through the use of additional steel tethers. The steel tethers are in the form of cables, stampings, tubes, etc., which reinforce the composite gate and the latch system (which ties to the body) to a counter balance system and the hinge system (which also ties back into the body structure).

The composite liftgate of the present invention provides the advantage over other inventions through the use of a wide steel reinforcement in the area of the latch. The wide steel reinforcement is installed with structural adhesive, or in another embodiment is insert molded for added structure. Mechanical fasteners are used as a temporary connection to hold the wide steel reinforcement in place until the structural adhesive sets up and cures. Tethers, similar to the tethers mentioned above, tie the lower reinforcement in the latch area to other important reinforced areas that extend to other reinforcements and to the upper hinges that again tie into the metallic body structure.

Another feature of the present invention is that the liftgate includes an inner composite panel. The structure of the inner composite panel includes various shapes and ribs which transfer the load path up through key structural areas of the assembly.

The inner panel is connected to an outer panel to form the composite liftgate of the present invention. The inner panel and outer panel are bonded together through the use of a urethane bonding. The inner panel provides structural support for the composite liftgate of the present invention not only through the shape of the inner panel as described above, but the material used to make the inner panel provides structural support as well. The inner panel is made of a structural thermoplastic, such as a polypropylene, a thermoset or thermoplastic such as a reinforced polypropylene (RPP), and is preferably a 40% glass-filled polypropylene. The outer panel is made of a typical thermoplastic used as a show surface, such as a thermoplastic polyolefin (TPO), and provides no significant structural support for the composite liftgate of the present invention.

An embodiment of a composite liftgate system is shown in the Figures generally at 10. The liftgate 10 includes a bracket 12, which is connected to an inner panel 14. In this embodiment, the bracket 12 is structurally bonded using an adhesive 16, but it is within the scope of the invention that the bracket 12 could be insert molded to connect the bracket 12 to the inner panel 14.

Also connected to the inner panel 14 are a set of lower pillar reinforcements 18 and a set of upper pillar reinforcements 20; both the reinforcements 18,20 are connected to the inner panel 14 in a similar manner as the bracket 12. Each of the lower pillar reinforcements 18 are typically connected to a gas strut (not shown), and the upper pillar reinforcements are typically attached to a hinge system (not shown), with the hinge system and gas strut connected to a vehicle.

The liftgate 10 of the present invention also includes a series of reinforcement members 22. The reinforcement members 22 will keep the liftgate 10 together even if the inner panel 14 becomes cracked or deformed from being subjected to an impact. In this embodiment, the reinforcement members 22 are in the form of tethers 22. The tethers 22 may be braded stainless steel cable, stainless steel tubing, a rolled or stamped steel channel, or a wide webbing material, similar to what is used in common seat belts.

Formed as part of the inner panel 14 are a first pair of channels or latch channels 24. The channels 24 run in a substantially diagonal pattern from the near the center of the bracket 12 to the lower pillar reinforcements 18. In this embodiment, the channels are 70 mm wide and 70 mm deep, but it is within the scope of the invention that other dimensions may be used as well. The two channels 24 shown in the Figures produce substantially a "V-pattern."

There are also two second channels 26 which are substantially perpendicular to the latch channels 24. Again, the additional channels 26 are 70 mm wide and 70 mm deep, but it is within the scope of the invention that other dimensions be used as well.

The inner panel 14 also includes a pair of third channels, or side channels 28, which again are 70 mm wide and 70 mm deep, and provide further structural support for the inner panel 14. The side channels 28 extend along each side of the inner panel 14, and intersect the latch channels 24 respectively in the general area of the lower pillar reinforcements 18.

To further improve the structural integrity of the inner panel 14, there is also a plurality of secondary reinforcement members, or ribs 30. The ribs 30 are also formed as part of the inner panel 14, similar to the channels 24,26,28. The ribs 30 are incorporated into all of the channels 24,26,28, and improve the rigidity of the entire lift gate 10.

Figure 9:
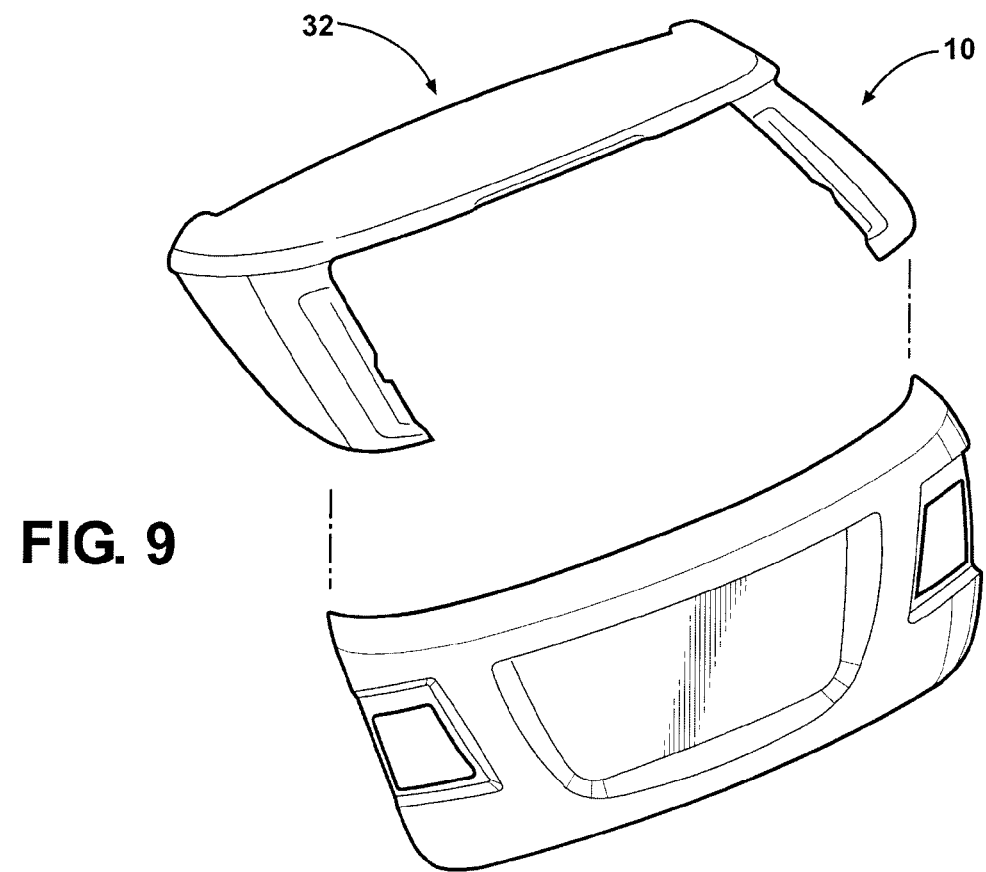
FIG. 9 is an exploded perspective view of a first embodiment of an outer panel used in a composite liftgate system, according to the present invention.
Figure 10:
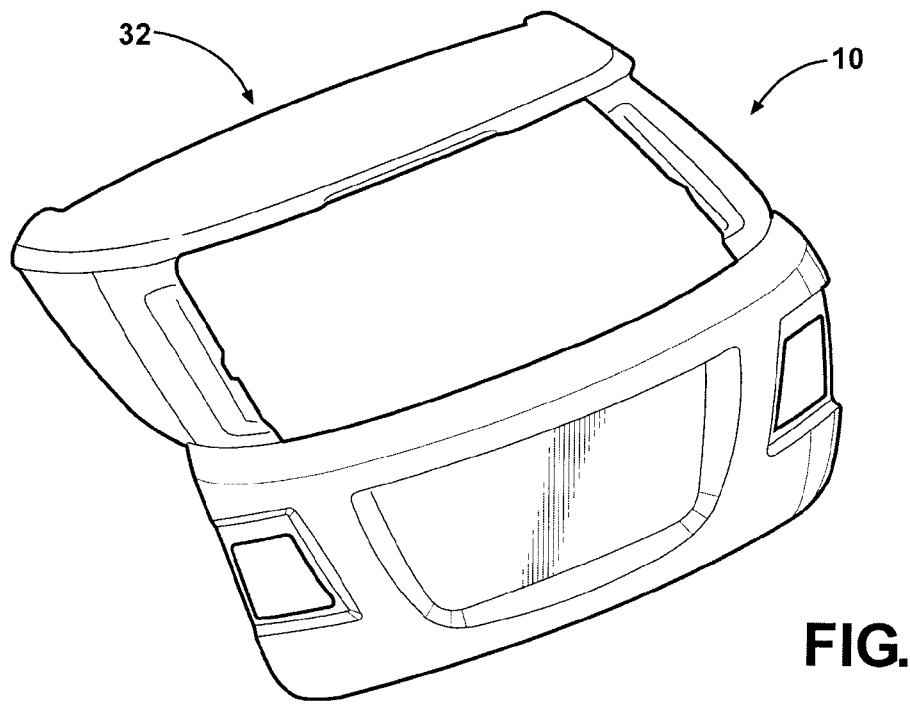
FIG. 10 is a perspective view of a second embodiment of an outer panel used in a composite liftgate system, according to a first embodiment of the present invention.

The liftgate 10 also includes an outer panel, generally shown at 32 in FIGS. 9 and 10. The outer panel 32 is connected to the inner panel 14 such that a cavity is formed between the inner panel 14 and outer panel 32. The outer panel 32 may be formed of two separate pieces, as shown in FIG. 9, or may be formed as a single piece, as shown in FIG. 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite liftgate system, comprising:
    an inner panel;
    a bracket connected to said inner panel such that when a force is applied to said bracket, the force is distributed to said inner panel
    at least one lower pillar reinforcement connected to said inner panel for increasing the structural integrity of said inner panel;
    latch channels formed in said inner panel and extending diagonally away from said bracket to said at least one lower pillar reinforcement;
    a pair of side channels formed in and extending along each side of said inner panel, wherein said pair of side channels intersect said latch channels; and
    a plurality of ribs formed in said latch channels and said pair of side channels.

2. The composite lift gate system of claim 1, further comprising:
    at least one upper pillar reinforcement connected to said inner panel for increasing the structural integrity of said inner panel; and
    at least one tether for connecting said at least one lower pillar reinforcement to said at least one upper pillar reinforcement, and for connecting said at least one lower pillar reinforcement to said bracket, and when said inner panel becomes cracked or deformed, said at least one tether will maintain a connection between said at least one lower pillar reinforcement and said at least one upper pillar reinforcement, and maintain a connection between said at least one lower pillar reinforcement and said bracket.

3. The composite lift gate system of claim 2, said at least one tether being one selected from the group consisting of braded stainless steel cable, stainless steel tubing, a rolled or stamped steel channel, and a wide webbing material.

4. The composite lift gate system of claim 2, further comprising an outer panel operable for being connected to said inner panel, wherein said lower pillar reinforcement, said upper pillar reinforcement, and said at least one tether are disposed between said inner panel and said outer panel when said inner panel is connected to said outer panel.

5. The composite lift gate system of claim 2, further comprising: at least one latch channel extending from the center of said bracket to said at least one lower pillar reinforcement; at least one channel extending along said inner panel and substantially perpendicular to said at least one latch channel; and at least one side channel extending along an outer portion of said inner panel, said at least one side channel being intersected by said at least one latch channel.

6. The composite lift gate system of claim 4, further comprising a plurality of secondary reinforcement members, a portion of said plurality of secondary reinforcement members disposed in at least one latch channel, a portion of said plurality of secondary reinforcement members disposed in said channel, and a portion of said plurality of secondary reinforcement members disposed in said at least one side channel.

7. The composite lift gate system of claim 4, wherein said at least one latch channel is substantially 70 millimeters wide and substantially 70 millimeters deep.

8. The composite lift gate system of claim 4, wherein said at least one channel is substantially 70 millimeters wide and substantially 70 millimeters deep.

9. The composite lift gate system of claim 4, wherein said at least one side channel is substantially 70 millimeters wide and substantially 70 millimeters deep.

10. The composite lift gate system of claim 4, said plurality of secondary reinforcement members further comprising a plurality of ribs.

11. The composite lift gate system of claim 1, wherein said bracket is connected to said inner panel through the use of a structural adhesive.

12. The composite lift gate system of claim 1, wherein said bracket is connected to said inner panel through the use of insert molding.

13. A composite liftgate system, comprising:
an inner panel; an outer panel operable for being connected to said inner panel such that a cavity is formed between said outer panel and said inner panel;
a plurality of reinforcements connected to said inner panel for increasing the structural integrity of said inner panel;
a bracket connected to said inner panel in a location such that said bracket is positioned between said inner panel and said outer panel, and when a force is applied to said bracket, the force is distributed to said inner panel;
at least one lower pillar reinforcement connected to said inner panel for increasing the structural integrity of said inner panel;
latch channels formed in said inner panel and extending diagonally away from said bracket to said at least one lower pillar reinforcement;
a pair of side channels formed in and extending along each side of said inner panel, wherein said pair of side channels intersect said latch channels; and
a plurality of ribs formed in said latch channels and said pair of side channels.

14. The composite liftgate system of claim 13, said bracket further comprising a wide reinforcing bracket.

15. The composite lift gate system of claim 14, wherein said wide reinforcing bracket is connected to said inner panel through the use of a structural adhesive.

16. The composite lift gate system of claim 14, wherein said wide reinforcing bracket is connected to said inner panel through the use of insert molding.

17. The composite liftgate system of claim 13, said plurality of reinforcements further comprising:
at least one upper pillar reinforcement operable for connection with said inner panel and being located in said cavity for increasing the rigidity of said inner panel; and
more than one tether, one of said more than one tether connected to both of said at least one lower pillar reinforcement and said at least one upper pillar reinforcement, one of said more than one tether connected to both of said at least one lower pillar reinforcement and said bracket, said more than one tether being operable to maintain a connection between said at least one lower pillar reinforcement and said at least one upper pillar reinforcement and between said at least one upper pillar reinforcement and said bracket when said inner panel becomes cracked or deformed.

18. The composite lift gate system of claim 17, wherein said more than one tether is one selected from the group consisting of braded stainless steel cable, stainless steel tubing, a rolled or stamped steel channel, and a wide webbing material.

19. The composite lift gate system of claim 17, wherein each of said at least one lower pillar reinforcement and said at least one upper pillar reinforcement are connected to said inner panel through the use of a structural adhesive.

20. The composite lift gate system of claim 17, wherein each of said at least one lower pillar reinforcement and said at least one upper pillar reinforcement are connected to said inner panel through the use of insert molding.

21. The composite lift gate system of claim 17, wherein at least one latch channel extending from the center of said bracket to said at least one lower pillar reinforcement;
at least one channel extending along said inner panel and substantially perpendicular to said at least one latch channel; at least one side channel extending along an outer portion of said inner panel, said at least one side channel being intersected by said at least one latch channel; and
a plurality of ribs being operable for providing support for each of said at least one latch channel, said at least one channel, and said at least one side channel, wherein at least one of said plurality of ribs is formed as part of said at least one latch channel, at least one of said plurality of ribs being is formed as part of said at least one channel, and at least one of said plurality of ribs is formed as part of said at least one side channel.

22. The composite lift gate system of claim 21, further comprising said at least one latch channel to be substantially 70 millimeters wide and substantially 70 millimeters deep.

23. The composite lift gate system of claim 21, further comprising said at least one channel to be substantially 70 millimeters wide and substantially 70 millimeters deep.

24. The composite lift gate system of claim 21, further comprising said at least one side channel to be substantially 70 millimeters wide and substantially 70 millimeters deep.

25. A composite liftgate system, comprising:
an inner panel; an outer panel operable for being connected to said inner panel such that a cavity is formed between said inner panel and said outer panel;
at least one lower pillar reinforcement connected to said inner panel and disposed in said cavity;
at least one upper pillar reinforcement connected to said inner panel and disposed in said cavity, wherein said at least one upper pillar reinforcement increases the structural integrity of said inner panel;
a plurality of tethers, one of said plurality of tethers connected to said at least one lower pillar reinforcement and to said at least one upper pillar reinforcement such that said at least one tether will remain connected to said at least one lower pillar reinforcement and said at least one upper pillar reinforcement when said inner panel becomes cracked or deformed;
a reinforcing bracket connected to said inner panel such that said reinforcing bracket is disposed in said cavity, and when a force is applied to said reinforcing bracket, said force is distributed to said inner panel;
wherein one of said plurality of tethers is connected to said at least one lower pillar reinforcement and said wide reinforcing bracket such that said at least one tether will remain connected to said at least one lower pillar reinforcement and said reinforcing bracket when said inner panel becomes cracked or deformed;

latch channels formed in said inner panel and extending diagonally away from said reinforcing bracket to said at least one lower pillar reinforcement;

a pair of side channels formed in and extending along each side of said inner panel, wherein said pair of side channels intersect said latch channels; and a plurality of ribs formed in said latch channels and said pair of side channels.

26. The composite lift gate system of claim 25, wherein said plurality of tethers are constructed of one selected from the group consisting of braded stainless steel cable, stainless steel tubing, a rolled or stamped steel channel, and a wide webbing material.

27. The composite lift gate system of claim 25, further comprising:

at least one latch channel formed as part of said inner panel, said at least one latch channel extending from the center of said bracket to said at least one lower pillar reinforcement;

at least one channel formed as part of said inner panel, said at least one channel extending along said inner panel and substantially perpendicular to said at least one latch channel;

at least one side channel formed as part of said inner panel, said at least one side channel extending along an outer portion of said inner panel, said at least one side channel being intersected by said at least one latch channel; and a plurality of ribs formed as part of said inner panel, said plurality of ribs being operable for providing support for each of said at least one latch channel, said at least one channel, and said at least one side channel, wherein at least one of said plurality of ribs is formed as part of said at least one latch channel, at least one of said plurality of ribs being is formed as part of said at least one channel, and at least one of said plurality of ribs is formed as part of said at least one side channel.

28. The composite lift gate system of claim 27, wherein said at least one latch channel is substantially 70 millimeters wide and substantially 70 millimeters deep.

29. The composite lift gate system of claim 27, wherein said at least one channel is substantially 70 millimeters wide and substantially 70 millimeters deep.

30. The composite lift gate system of claim 27, wherein said at least one side channel is substantially 70 millimeters wide and substantially 70 millimeters deep.

31. The composite lift gate system of claim 25, wherein each of said reinforcing bracket, said at least one lower pillar reinforcement, and said at least one upper pillar reinforcement are connected to said inner panel through the use of a structural adhesive.

32. The composite lift gate system of claim 25, wherein each of said reinforcing bracket, said at least one lower pillar reinforcement, and said at least one upper pillar reinforcement are connected to said inner panel through the use of insert molding.

* * * * *

UNITED STATES PATENT AND TRADEMARK OFFICE
CERTIFICATE OF CORRECTION

PATENT NO. : 8,403,399 B2
APPLICATION NO. : 12/992163
DATED : March 26, 2013
INVENTOR(S) : Christopher J. Kuntze et al.

It is certified that error appears in the above-identified patent and that said Letters Patent is hereby corrected as shown below:

In the Specification:

Column 3, Line 40, "braded" should be --braided--.

Column 3, Line 46, "from the near the center of the" should be --from near the center of the--.

In the Claims:

Column 4, Line 49, Claim 3, "braded" should be --braided--.

Column 6, Line 29, Claim 21, delete "being".

Column 7, Line 11, Claim 26, "braded" should be --braided--.

Column 8, Line 5, Claim 27, delete "being".

Signed and Sealed this
Twenty-ninth Day of October, 2013

Teresa Stanek Rea
*Deputy Director of the United States Patent and Trademark Office*